United States Patent
Johnson

(10) Patent No.: US 11,243,135 B2
(45) Date of Patent: Feb. 8, 2022

(54) HOVERING CENTRIPETAL PROJECTILE BALANCE APPARATUS

(71) Applicant: Kenneth Alden Johnson, Crawfordville, FL (US)

(72) Inventor: Kenneth Alden Johnson, Crawfordville, FL (US)

(*) Notice: Subject to any disclaimer, the term of this patent is extended or adjusted under 35 U.S.C. 154(b) by 284 days.

(21) Appl. No.: 16/445,384

(22) Filed: Jun. 19, 2019

(65) Prior Publication Data

US 2020/0400526 A1     Dec. 24, 2020

(51) Int. Cl.
*G01M 1/02*     (2006.01)
*B04C 3/00*     (2006.01)
*F42B 35/02*    (2006.01)

(52) U.S. Cl.
CPC .............. *G01M 1/02* (2013.01); *B04C 3/00* (2013.01); *F42B 35/02* (2013.01)

(58) Field of Classification Search
CPC .. G01M 1/02; G01M 1/06; B04C 3/00; F42B 35/02
See application file for complete search history.

(56) References Cited

U.S. PATENT DOCUMENTS

| | | | | |
|---|---|---|---|---|
| 2,353,150 A | * | 7/1944 | Dietz | F42B 35/02 73/472 |
| 2,478,663 A | * | 8/1949 | Masket | G01M 1/22 73/476 |
| 4,467,639 A | * | 8/1984 | Bush | F42B 35/00 73/167 |
| H174 H | * | 12/1986 | Mermagen | 384/100 |
| 4,688,427 A | * | 8/1987 | Hyland, Jr. | G01M 1/16 73/460 |
| 5,067,349 A | * | 11/1991 | Hirchert | G01M 1/06 73/472 |
| 5,583,906 A | * | 12/1996 | Sugiura | H01J 9/42 378/132 |
| 5,705,740 A | * | 1/1998 | Unno | G01M 1/06 73/65.07 |

OTHER PUBLICATIONS

Beams et al. "The Ultracentrifuge"; Science, v. 78, pp. 338-340. (Year: 1933).*

* cited by examiner

*Primary Examiner* — Natalie Huls
(74) *Attorney, Agent, or Firm* — The Rapacke Law Group, P.A.

(57) ABSTRACT

A non-destructive device that measures the accuracy potential and relative ballistic coefficient of projectiles, by placing the object tested within a swirling vortex having both a rotational and vertical vector, hovering the projectile essentially above the device, and essentially unencumbered by any stator. A perfectly balanced object hovers and turns at a high rate about its long/vertical axis without contact with the device.

10 Claims, 4 Drawing Sheets

HOVERING CENTRIPETAL PROJECTILE BALANCE APPARATUS

CROSS-REFERENCE TO RELATED APPLICATIONS

Figure 1:
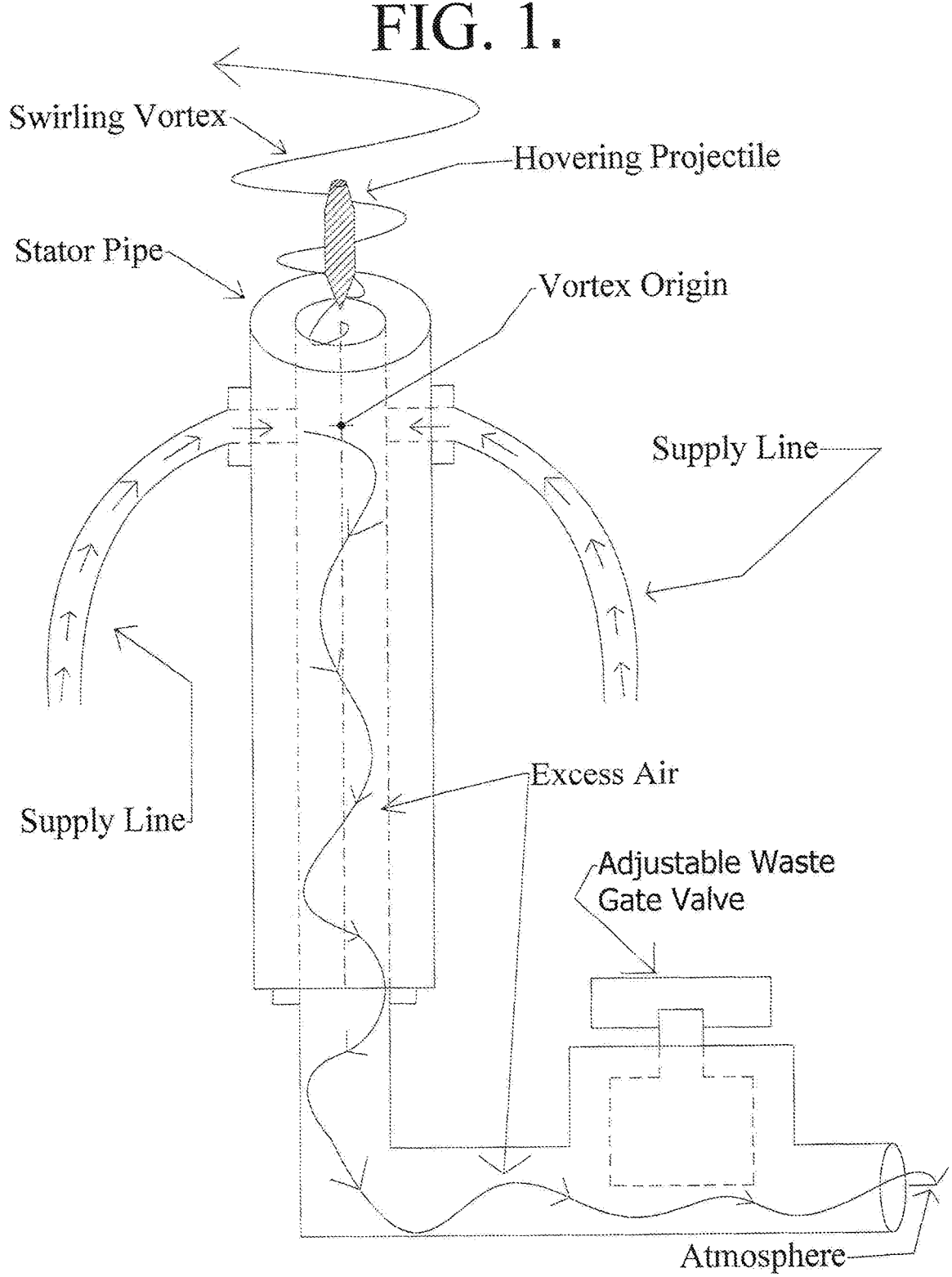

Provisional Patent Application Number: 62/654,339
Filing Date: Jun. 18, 2018

STATEMENT REGARDING FEDERALLY SPONSORED RESEARCH AND DEVELOPMENT

N/A.

THE NAMES OF THE PARTIES TO A JOINT RESEARCH AGREEMENT

N/A.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

N/A

STATEMENT REGARDING PRIOR DISCLOSURES BY THE INVENTOR OR A JOINT INVENTOR

No disclosure of this invention was made at any time before the provisional patent filing date of Jun. 18, 2018.

BACKGROUND OF THE INVENTION

(1) Field of the Invention

Ammunition (F42 for other reference)

(2) Description of Related Art

A projectile dynamic balance machine of the captured vertical/air stream exist and is referenced under patent U.S. Pat. No. 2,353,150.

This Deitz device of 1943 utilizes a vertical cone stator and pressurized airflow to induce rotation upon a projectile about its primary axis, while the projectile is confined within the device. The desired effect is to cause rotation of the projectile about its long axis, and the desired result is the measurement of the dynamic imbalance of the bullet by way of an armature/coil included within the patented design.

The Deitz Bullet Spinning Machine necessitates a flexibly supported quadric, conical, ellipsoidal, or concave stator, whereby the shape of both the rotor and stator slowly, mutually and increasingly diverge from their mutual annular point of contact. According to Deitz, the ring of jets must be precisely located within the stator so as to direct pressurized air towards the rotor at the said location of minimum clearance between the stator and the rotor. The air jets are also positioned obliquely upwards, approximately 15 degrees from horizontal. The device requires 25-30 pounds per square inch of pressurized air to operate. Other prior art involves induced air currents upon the sidewall of a projectile, yet induced at a location along the sidewall of the main body maximum diameter. This prior art also incorporates the generation of an electrical signal that is supplied to a stereo headset. Reference to balance is witnessed by way of listening to the pitch (frequency) of the electrical signal. (Harold Vaughn, "Rifle Accuracy Facts". 1998. pp. 173-174)

In all prior art, the projectiles are encumbered and prevented from free range of motion and are supported along their sidewalls of primary axis by a stator, a supportive wall, floor or plate. This encumbrance prevents the visual comparison of rotating projectiles in a swirling vortex, prevents full oscillative motion of the projectile before it becomes unstable at varying RPM's, prevents the visual witnessing of low and high frequency oscillation, and do not intend to permit the measurement of relative ballistic coefficient, by way of measuring relative air resistance in the vertical vector. Further, no prior art of any individual device is readily adaptable to a broad range of projectiles, across several calibers. This, because of the necessary form of the stator, and necessary location of the air jets. No prior art is readily adaptable to industrial applications, where mass quantities of projectiles can be tested in situ at the loading operation. This, because the stator hole will accept either point-downward or point-upward projectiles, yet the form of the stator and necessary location of the air jets will not provide reliable characterization of the tested object.

In all prior art, nothing permits the sum of force vectors to cause a projectile to "fly" nose first or base first, with a swirling vortex originating below the vertex or heel of the projectile, the projectile essentially hovering above the entire device, the device imparting both lift and rotation about the projectiles long axis unencumbered in a swirling vortex. No prior art claims relative measurement of ballistic coefficient (expressed as higher flight in the swirling vortex, or witnessed by instrumentation of air pressure) oscillation, balance, essentially mimicking the true environment (dynamic balance under high RPM and air resistance) within which a fired projectile flies.

BRIEF SUMMARY OF THE INVENTION

A non-destructive device that measures the dynamic stability and relative ballistic coefficient of an object. The invention is a conglomeration of simple pipes and valves that direct and control gas or other medium upon a projectile frontal or tall area and cause the vertex or heel of a projectile to spin unencumbered at or above the origin of vortex generation, with the projectile main axis perpendicular to the ground.

BRIEF DESCRIPTION OF THE SEVERAL VIEWS OF THE DRAWING(S)

FIG. 1. Side view of the device, including the stator pipe, the air supply lines that create the swirling vortex, the hovering projectile within the swirling vortex, the relative distance between the vortex origin and the hovering projectile, the excess air path, and excess air control valve.

Figure 2:
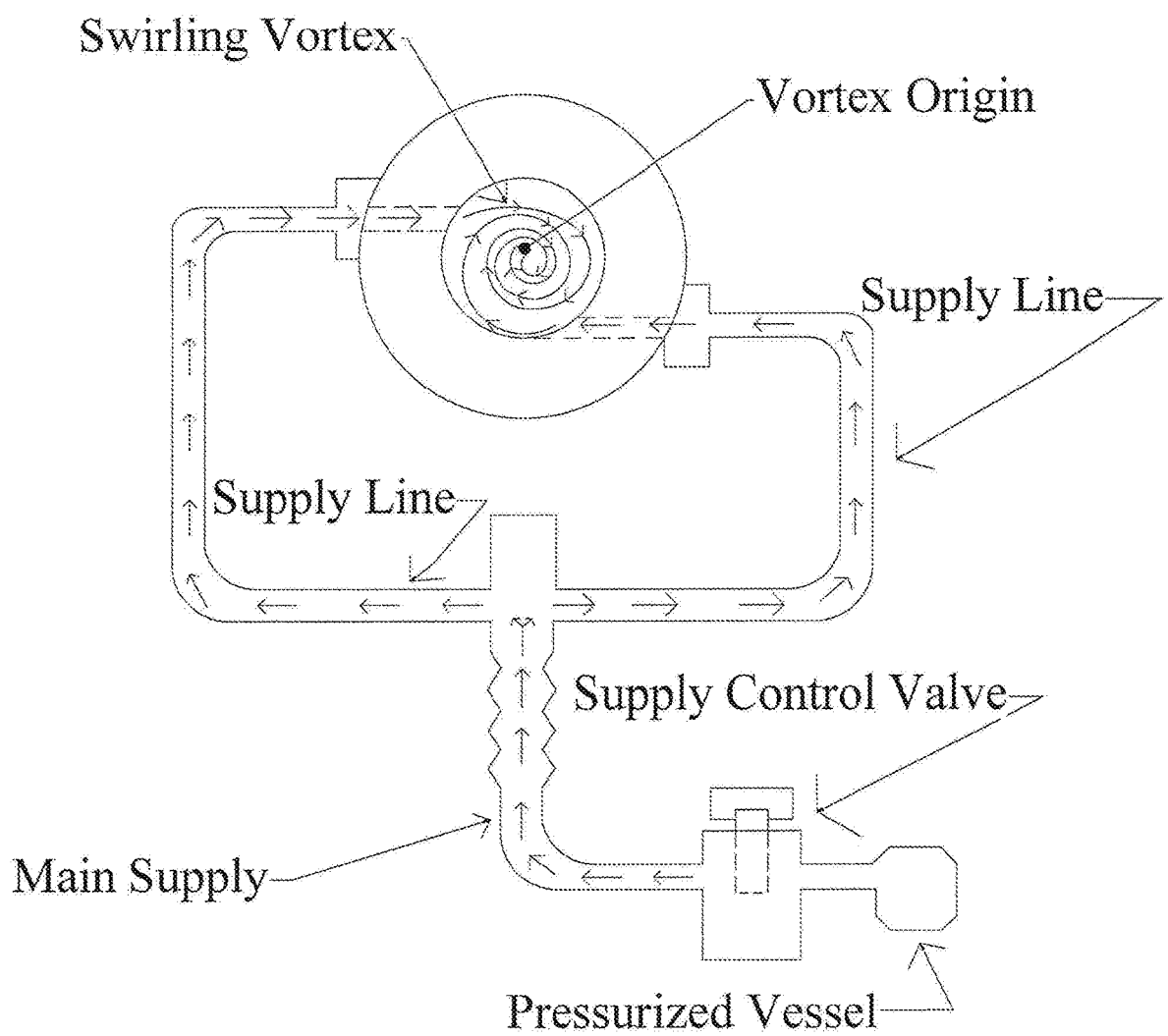

FIG. 2. Top view of the device, including the stator pipe, the air supply lines that create the swirling vortex, the vortex origin, the main supply line, supply control valve and pressurized air supply.

Figure 3:
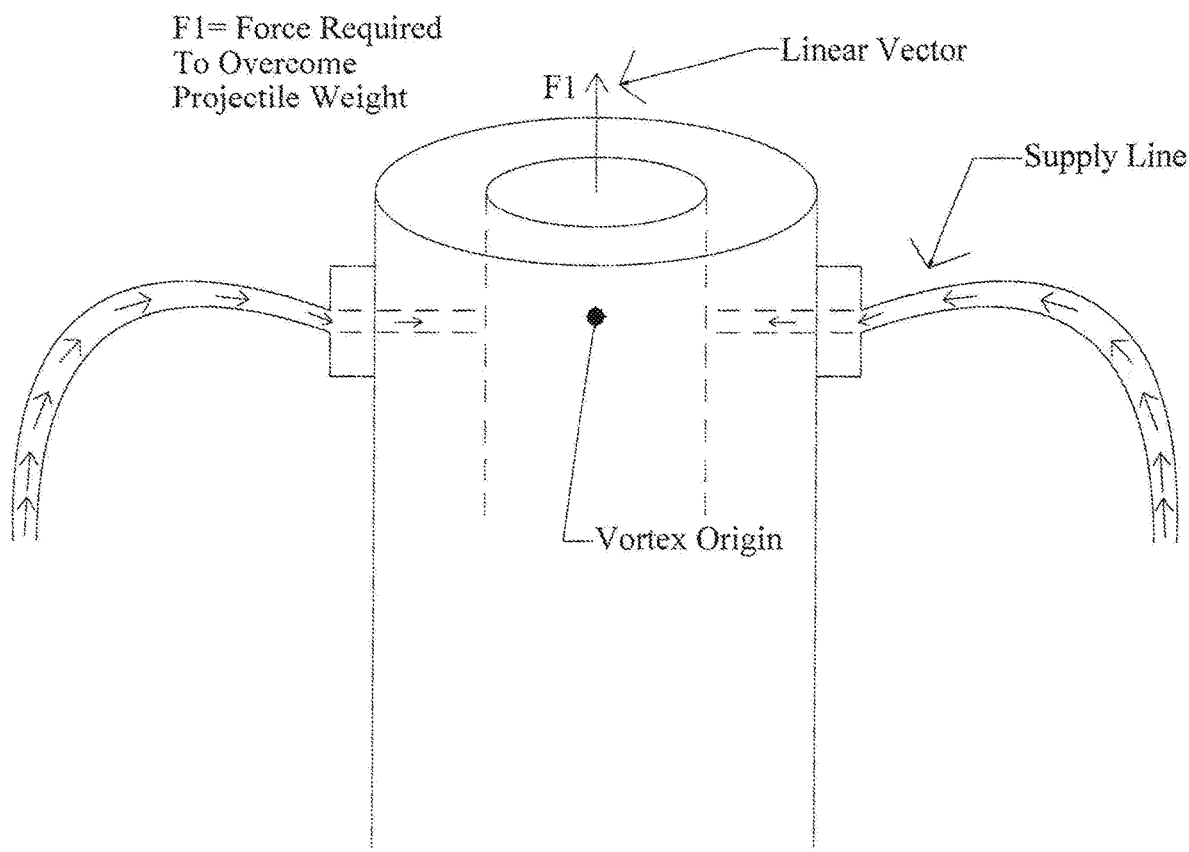

FIG. 3. Side view denoting the resultant vertical vector required to lift a projectile above the vortex origin, and hover that projectile substantially above the entire device.

Figure 4:
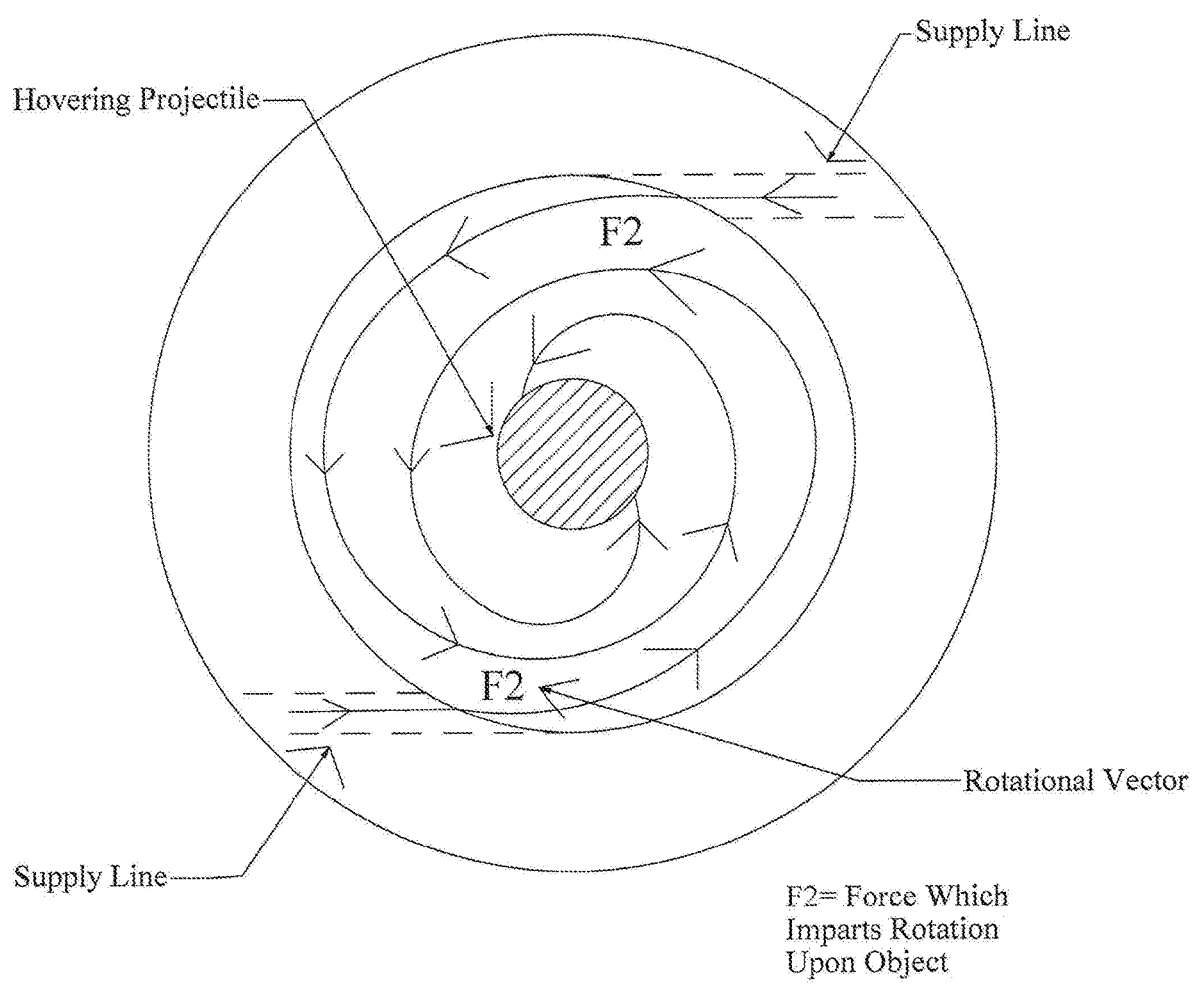

FIG. 4. Top view denoting the resultant rotational vector required to turn a projectile at a rate sufficient to stabilize unencumbered by any solid material.

DETAILED DESCRIPTION OF THE INVENTION

A vertical straight stator pipe is plumbed with gas or liquid supply lines offset from the central pipe axis, such that upon application of force by gas or liquid through the supply lines, rotation of the gas or liquid medium is generated within the stator pipe. From this point of origin of force within the stator pipe, a swirling vortex is generated. This vortex may be permitted to exit both sides of the vertical pipe. At the upper mouth of the vertical stator pipe, a projectile is introduced to the vortex where the projectile long axis is centered with the long axis of the stator pipe. The projectile is then set free of encumbrances, and permitted to rotate and hover essentially above the device. The projectile, by means of F2 rotational vector causing increasing angular momentum, may stabilize within the swirling vortex, depending upon the relationship of center of mass and geometric center of the object and any disproportionate centripetal force caused by imbalance. The same projectile's vertex may hover at or above the vortex origin, depending upon the vertical vector applied below the object and the relative air resistance along the surface of any particular projectile.

The opposite and lower end of the vertical pipe is plumbed with an adjustable waste gate valve. This waste gate valve permits the tuning of F1 vector flow originating from the supply lines, to equal the force required to keep a particular projectile form, weight and diameter suspended in the swirling vortex, at or above the point of origin of the swirling vortex. Through the regulation of the bottom variable waste gate valve, optimized vertical lift upon the surface area of the projectile or object can be achieved to cause the vertex of the projectile or object to hover at or above the origin of the vortex.

The supply lines are plumbed to a regulator control valve, pressure gauge and source. The regulation of medium through the balanced supply lines controls spin rate of the projectile.

By optimizing both the inputs of supply flow rate and waste gate flow rate, a dynamically balanced object's vertex may hover at or above the stator pipe vortex origin, entirely unencumbered by the stator in all axes, held only by the positive and negative forces of the swirling vortex, substantially above the entire device, and rotate at a high rate. That is to say, when the device is tuned or optimized for any particular objects weight, form and diameter, objects with acceptable dynamic balance will stay in the rotating vortex, while objects of poor dynamic balance will falter within or fall from the rotating vortex.

These same force vectors created by the spinning and lifting medium will also cause objects with higher coefficients of form (lower air resistance) to ride lower in the rotating vortex, and objects with lower coefficients of form (higher air resistance) to ride higher in the rotating vortex. This "height differential" directly corresponds with relative ballistic coefficient of projectiles, and is directly witnessed as any projectile is rotated and lifted in the swirling vortex.

Through prior art instrumentation (non-contact height measurement, non-contact tachometer, accelerometers) or by simply tuning a failure mode combination of rotation and lift, objects tested for flight in a swirling vortex can be characterized. Those characterizations can then be used to sort dissimilar objects.

Industrial application of this particular device is readily incorporated with existing collating and sorting methods familiar to the ammunition industry. As the intention and function of this device is to hover dynamically balanced projectiles above a stator, the same balanced projectiles are collated in the proper position, and if hovering, proven to meet a quality standard, readily chosen and picked with automated machinery. Projectiles that don't meet the dynamic balance standards either fall out of the swirling vortex, or falter within it.

Of particular benefit, the same device, with same dimensions, and same stator, is capable of sorting a large array of projectile diameters, forms and weights, without changing any physical dimension of the design. As no peculiar quadric cone is incorporated within the stator, and the gas jets need not be positioned at any point of minimal clearance, this device presents broad utility.

What is claimed is:

1. A non-destructive test apparatus comprising:
   a pressurized vessel containing a fluid;
   a stator pipe having a central axis coaxial with an elongated dimension;
   a plurality of supply lines plumbed between the pressurized vessel and the stator pipe and
   in fluid communication around the circumference of the stator pipe, wherein each of the plurality of supply lines are offset from the central axis of the stator pipe in a first direction perpendicular to the central axis and each of the plurality of supply lines are offset from an adjacent supply line in a second direction perpendicular to the first direction;
   at least one variable valve plumbed in fluid communication to control a fluid flow rate;
   wherein the flow of fluid from the pressurized vessel generates a swirling vortex having an origin within the stator pipe and extending along the central axis substantially beyond a distal end portion of the stator pipe;
   a projectile positioned within the swirling vortex such that the swirling vortex causes the projectile to spin unencumbered at or above the origin of the swirling vortex;
   wherein the test apparatus is configured to dynamically measure lift and rotational characteristics of the projectile motion responsive to the fluid flow rate.

2. The non-destructive test apparatus of claim 1, wherein the test apparatus is configured to measure the dynamic stability of the projectile.

3. The non-destructive test apparatus of claim 2, wherein the swirling vortex comprises a rotational vector, wherein the test apparatus is configured to cause the projectile to rotate by spinning along the central axis at a rate sufficient to enable the measurement of dynamic stability of the spinning projectile, unencumbered.

4. The non-destructive test apparatus of claim 1, wherein the test apparatus is configured to measure the relative ballistic coefficient of the projectile.

5. The non-destructive test apparatus of claim 4, wherein the swirling vortex comprises a lift vector, wherein the test apparatus is configured to cause the projectile to lift along the central axis a distance sufficient to enable measurement of the relative ballistic coefficient of the projectile by measuring relative fluid resistance to the lift vector of the projectile, unencumbered.

6. The non-destructive test apparatus of claim 1, wherein the swirling vortex comprises a lift vector, wherein the test apparatus is configured to cause a vertex of a substantially perfectly dynamically balanced projectile to hover unencumbered along the central axis essentially at or above the origin of the swirling vortex and a body portion of the projectile to hover unencumbered along the central axis substantially beyond a distal end portion of the stator pipe.

7. The non-destructive test apparatus of claim 1, wherein the central axis is perpendicular to the ground.

8. The non-destructive test apparatus of claim 1, wherein the stator pipe is square cut at a distal portion and has no quadric mating surface within the stator pipe.

9. The non-destructive test apparatus of claim 1, wherein the fluid flow rate is dynamically controlled to produce a variable effective cone diameter, wherein the test apparatus is adaptable to test projectiles having differing diameters, forms, and weights.

10. The non-destructive test apparatus of claim 1, wherein the swirling vortex comprises an axial high-pressure and a central low-pressure region, wherein the high-pressure region of the swirling vortex creates an effective fluid cone of support and imparts rotational force, and the low-pressure region creates a void, wherein the projectile may dynamically move unencumbered along the central axis.

\* \* \* \* \*